(12) United States Patent
Heiman

(10) Patent No.: US 8,190,185 B2
(45) Date of Patent: *May 29, 2012

(54) METHOD AND SYSTEM FOR DECODING SACCH CONTROL CHANNELS IN GSM-BASED SYSTEMS WITH PARTIAL COMBINING

(75) Inventor: Arie Heiman, Rannana (IL)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/755,000

(22) Filed: Apr. 6, 2010

(65) Prior Publication Data

US 2010/0189201 A1  Jul. 29, 2010

Related U.S. Application Data

(63) Continuation of application No. 11/325,759, filed on Jan. 5, 2006, now Pat. No. 7,693,531.

(60) Provisional application No. 60/752,450, filed on Dec. 21, 2005.

(51) Int. Cl.
*H04B 7/00* (2006.01)
*H04W 84/02* (2009.01)

(52) U.S. Cl. .................... 455/515; 455/67.11; 455/509; 455/68

(58) Field of Classification Search .................. 455/515, 455/502, 509, 507, 514, 511, 517, 516, 67.11, 455/68, 62, 75, 434; 375/260, 295, 308, 375/341, 343, 150; 370/310, 347
See application file for complete search history.

(56) References Cited

U.S. PATENT DOCUMENTS

| 5,341,401 | A | * | 8/1994 | Farjh et al. | 375/341 |
| 5,838,729 | A | * | 11/1998 | Hu et al. | 375/265 |
| 7,257,760 | B2 | * | 8/2007 | Rick et al. | 714/760 |
| 2006/0221880 | A1 | * | 10/2006 | Riddington et al. | 370/310 |

OTHER PUBLICATIONS

Mark Austin, SAIC and Synchronized Networks for Increased GSM Capacity, Sep. 2003, 26 pages.

* cited by examiner

*Primary Examiner* — John J Lee
(74) *Attorney, Agent, or Firm* — Sterne, Kessler, Goldstein & Fox PLLC

(57) ABSTRACT

Methods and systems for signal processing are disclosed herein and may include storing bit sequences for a plurality of previously received control channels. A bit sequence for a currently received control channel may be correlated with at least one of the bit sequences for the plurality of previously received control channels. One of the bit sequences for the plurality of previously received control channels may be selected to represent the bit sequence for the currently received control channel, based on the correlating. The selected one of the stored bit sequences for the plurality of previously received control channels may include a maximum correlation. The maximum correlation may be higher than a threshold value. The bit sequence for the currently received control channel may include slow associated control channel information. The bit sequence for the currently received control channel may be decoded using Viterbi decoder and/or fire code decoder.

20 Claims, 9 Drawing Sheets

METHOD AND SYSTEM FOR DECODING SACCH CONTROL CHANNELS IN GSM-BASED SYSTEMS WITH PARTIAL COMBINING

CROSS-REFERENCE TO RELATED APPLICATIONS/INCORPORATION BY REFERENCE

This application makes reference, claims priority to, and claims the benefit of U.S. application Ser. No. 11/325,759 filed Jan. 5, 2006 which makes reference, claims priority to, and claims the benefit of U.S. Provisional Application Ser. No. 60/752,450 filed Dec. 21, 2005, and hereby is incorporated herein by reference in its entirety.

This application makes reference to:
U.S. application Ser. No. 11/325,721 filed on Jan. 5, 2006;
U.S. application Ser. No. 11/325,720 filed on Jan. 5, 2006;
U.S. application Ser. No. 11/325,751 filed on Jan. 5, 2006;
U.S. application Ser. No. 11/325,808 filed on Jan. 5, 2006;
U.S. application Ser. No. 11/326,066 filed on Jan. 5, 2006;
U.S. application Ser. No. 11/325,997 filed on Jan. 5, 2006;
U.S. application Ser. No. 11/150,926, filed on Jun. 13, 2005;
U.S. application Ser. No. 11/271,692, filed on Nov. 10, 2005;
U.S. application Ser. No. 11/150,931, filed on Jun. 13, 2005;
U.S. application Ser. No. 11/150,957, filed on Jun. 13, 2005;
U.S. application Ser. No. 11/151,030, filed on Jun. 13, 2005;
U.S. application Ser. No. 11/151,029, filed on Jun. 13, 2005;
U.S. application Ser. No. 11/189,509, filed on Jul. 26, 2005; and
U.S. application Ser. No. 11/189,634, filed on Jul. 26, 2005.

Each of the above stated applications is hereby incorporated herein by reference in its entirety.

FIELD OF THE INVENTION

Certain embodiments of the invention relate to cellular communication systems. More specifically, certain embodiments of the invention relate to a method and system for decoding slow associated control channels (SACCH) in GSM-based systems with partial combining.

BACKGROUND OF THE INVENTION

Cellular communication systems provide wireless communication services in many populated areas of the world. While cellular communication systems were initially constructed to service voice communications, they are now called upon to support data communications as well. The demand for data communication services has exploded with the acceptance and widespread use of the Internet. While data communications have historically been serviced via wired connections, cellular users now demand that their wireless units also support data, communications. Many wireless subscribers now expect to be able to "surf" the Internet, access their email, and perform other data communication activities using their cellular phones, wireless personal data assistants, wirelessly linked notebook computers, and/or other wireless devices. The demand for wireless communication system data communications continues to increase with time. Thus, existing wireless communication systems are currently being created or modified to service these burgeoning data communication demands.

Cellular wireless networks include a "network infrastructure" that wirelessly communicates with wireless terminals within a respective service coverage area. The network infrastructure typically includes a plurality of base stations dispersed throughout the service coverage area, each of which supports wireless communications within a respective cell or set of sectors. The base stations may be coupled to base station controllers (BSCs), with each BSC serving a plurality of base stations. Each BSC couples to a mobile switching center (MSC). Each BSC also typically directly or indirectly couples to the Internet.

In operation, each base station (BS) communicates with a plurality of wireless terminals operating in its cell/sectors. A BSC coupled to the base station routes voice communications between the MSC and the serving base station. The MSC routes the voice communication to another MSC or to the PSTN, for example. The BSCs route data communications between a servicing base station and a packet data network that may include or couple to the Internet. Transmissions from base stations to wireless terminals are referred to as "forward link or downlink" transmissions while transmissions from wireless terminals to base stations are referred to as "reverse link or uplink" transmissions.

Wireless links between base stations and their serviced wireless terminals typically operate according to one or more of a plurality of operating standards. These operating standards define the manner in which the wireless link may be allocated, setup, serviced, and torn down. One popular cellular standard is the Global System for Mobile telecommunications (GSM) standard. The GSM standard, or simply GSM, is predominant in Europe and is in use around the globe. While GSM originally serviced only voice communications, it has been modified to also service data communications. GSM General Packet Radio Service (GPRS) operations and the Enhanced Data rates for GSM (or Global) Evolution (EDGE) operations coexist with GSM by sharing the channel bandwidth, slot structure, and slot timing of the GSM standard. The GPRS operations and the EDGE operations may also serve as migration paths for other standards as well, e.g., IS-136 and Pacific Digital Cellular (PDC).

In order for EDGE to provide increased data rates within a 200 KHz GSM channel, it employs a higher order modulation, 8-PSK (octal phase shift keying), in addition to GSM's standard Gaussian Minimum Shift Keying (GMSK) modulation. EDGE allows for nine different (autonomously and rapidly selectable) air interface formats, known as Modulation and Coding schemes (MCSs), with varying degrees of error control protection. Low MCS modes, (MCS 1-4) use GMSK (low data rate) while high MCS modes (MCS 5-9) use 8-PSK (high data rate) modulation for over the air transmissions, depending upon the instantaneous demands of the application.

After a wireless link is established between a base station (BS) and a wireless terminal or a mobile station (MS), the base station may communicate control information and/or system information to the mobile station. The control information and/or system information may be encoded by the base station prior to being transmitted to the mobile station. The mobile station may decode and utilize the control information and/or system information during operation of the established wireless link. However, prior techniques for decoding utilized by the mobile station may not fully recover the original control information and/or system information that was encoded and communicated by the base station.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and method for decoding slow associated control channels (SACCH) in GSM-based systems with partial combining, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for decoding slow associated control channels (SACCH) in GSM-based systems with partial combining. Aspects of the method may comprise storing SACCH blocks for a plurality of previously received control channels. The SACCH blocks for the plurality of previously received control channels and the corresponding times that the SACCH blocks are received may be stored in memory. A SACCH block for a currently received control channel may be correlated with at least one of the SACCH blocks for the plurality of previously received control channels. One of the SACCH blocks for the plurality of previously received control channels may be selected to represent the bit sequence for the currently received control channel, based on the correlating. The selected one of the stored SACCH blocks for the plurality of previously received control channels may comprise a maximum correlation, and the maximum correlation may be higher than a threshold value.

Figure 1A:
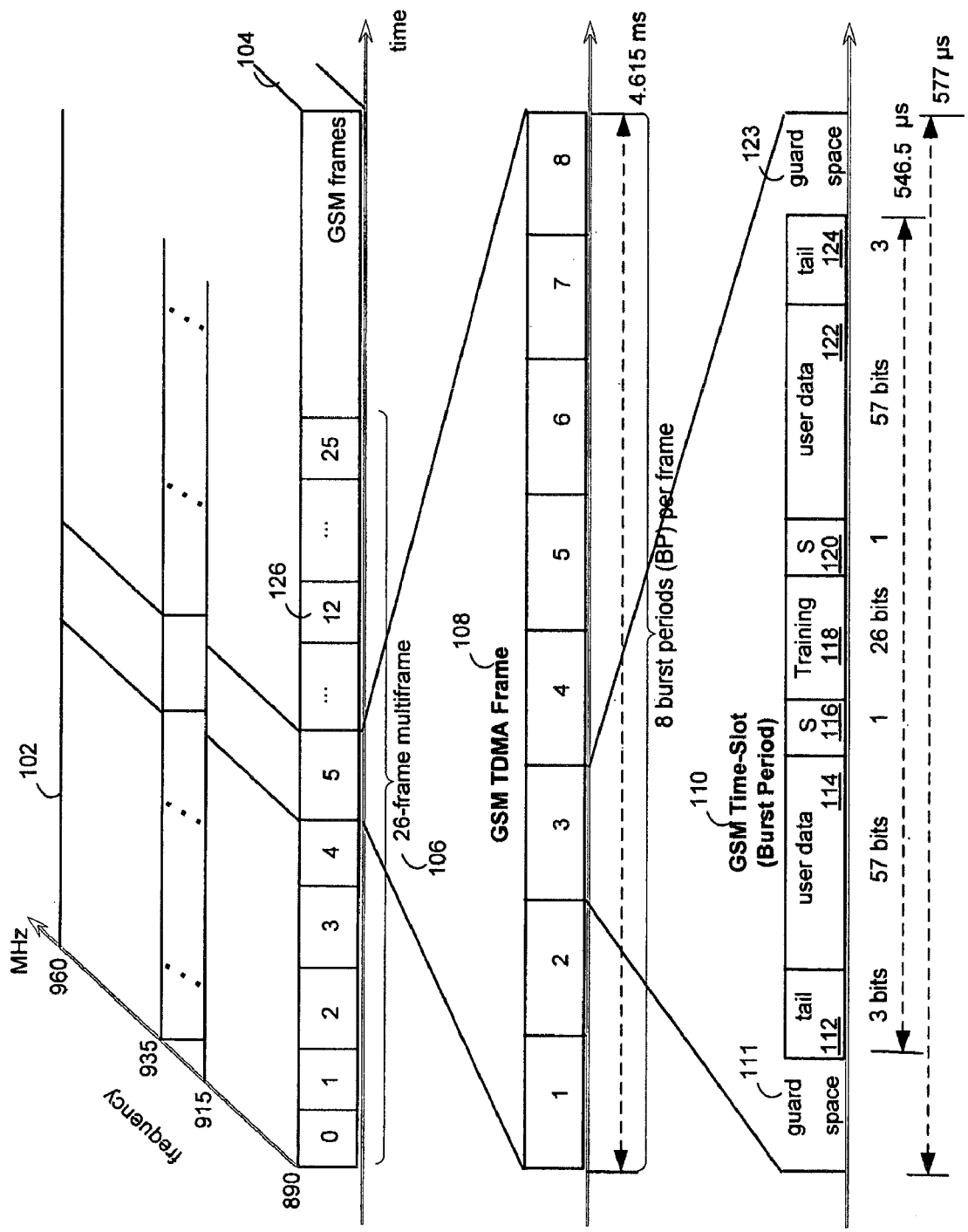
FIG. 1A is a graph illustrating an exemplary GSM frame and a burst period, which may be used in accordance with an embodiment of the invention.

FIG. 1A is a graph illustrating an exemplary GSM frame and a burst period, which may be used in connection with an embodiment of the invention. GSM utilizes a combination of Time and Frequency Division Multiple Access (TDMA/FDMA). Referring to FIG. 1A, there is shown a downlink frequency band 102, an uplink frequency band 104, a GSM TDMA frame 108 and a GSM timeslot or burst period 110. The GSM downlink frequency band 102 comprises a range of 935-960 MHz and the GSM uplink frequency band comprises a range of 104 is 890-915 MHz. The FDMA aspect of GSM involves the division of frequency of the 25 MHz bandwidth for the uplink frequency band 104 and the downlink frequency band 102 into 124 carrier frequencies, each of which comprises a bandwidth of 200 kHz. One or more carrier frequencies may be assigned per base station. The TDMA aspect of GSM involves the division in time of each carrier frequency into 8 time-slots, or burst periods (BPs), such as BP 110. One time-slot may be used for transmission by a mobile station and one time-slot may be used for reception.

The GS timeslot or BP 110 may comprise tail portions 112 and 124, user data portions 114 and 122 stealing bits 116 and 120, a training sequence 118, and guard space 111 and 123. The tail portions 112 and 124 may each comprise 3 bits, for example, and may be utilized as separators. The user data portions 114 and 122 may each comprise 57 bits, for example, and may be used for data transmission. The stealing bits 116 and 120 may each comprise 1 bit and may be used by fast associated control channel (FACCH) messages. The training sequence 118 may comprise 26 bits, for example, and may be utilized by a mobile station receiver to synchronize and compensate for time dispersion produced by multipath propagation. The guard space 111 and 123 may each comprise 8.25 bits, for example, and may allow for propagation time delay in the arrival of bursts. The burst period 110 may be transmitted in 0.577 milliseconds.

Each group of 8 time-slots or burst periods, such as the burst period 110, may form a GSM TDMA frame 108. The GSM frame 108 may be transmitted every 4.615 ms. GSM frames, such as the GSM frame 108, may be further grouped into multiframes. A GSM multiframe may comprise 26 TDMA frames or 51 TDMA frames. For example, the GSM multiframe 106 may comprise 26 TDMA frames, numbered 0, 1, . . . , 25. The 26-frame multiframe 106 may comprise 24 traffic channels (TCH), which may be communicated in frames 0, 1, . . . , 11 and frames 13, 14, . . . , 24. The $13^{th}$ frame 126 may be used for communicating a slow associated control channel (SACCH) block. The last $25^{th}$ frame is currently not used in GSM-based systems.

Figure 1B:
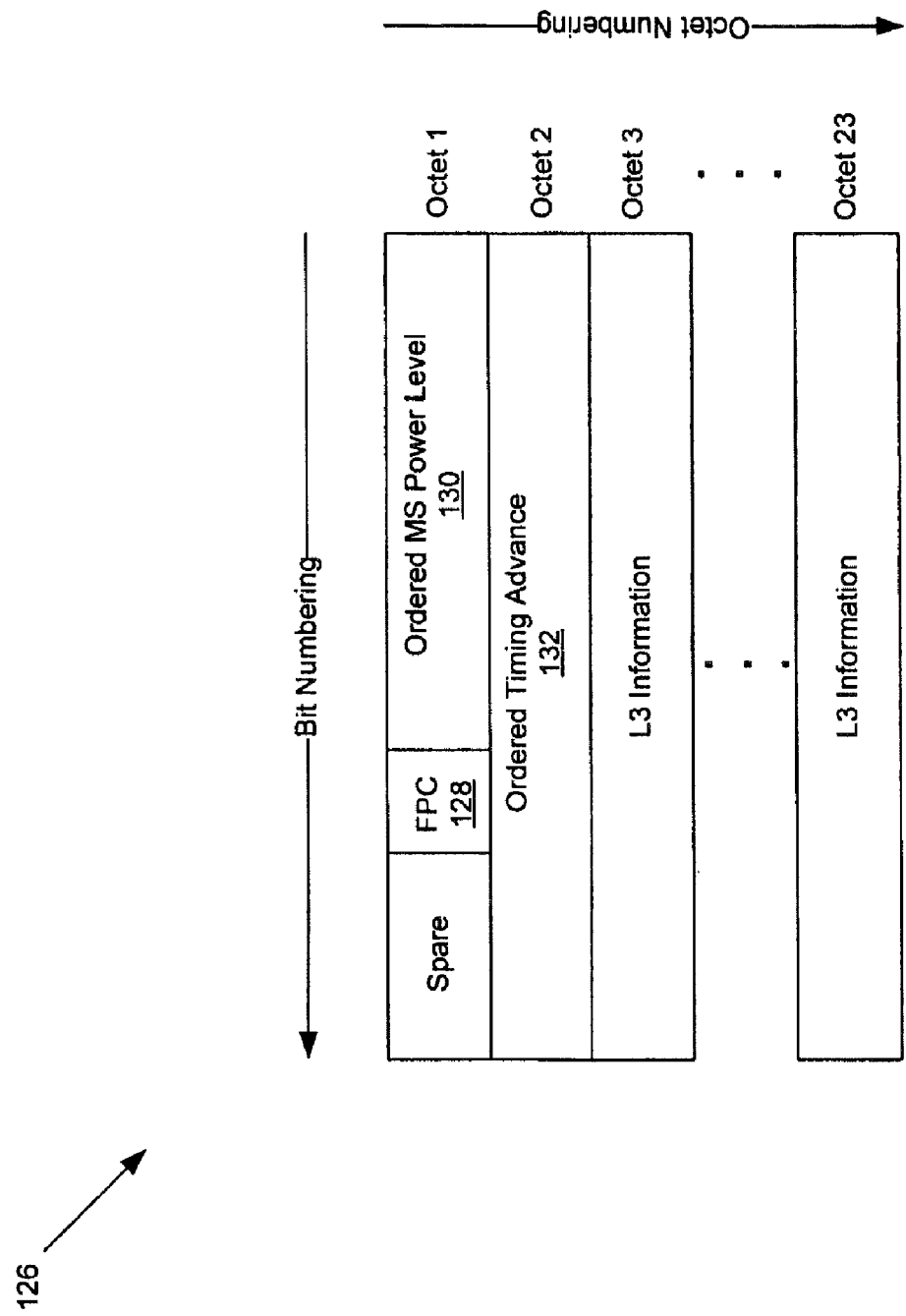
FIG. 1B is a block diagram of an exemplary slow associated control channel (SACCH) block, which may be used in accordance with an embodiment of the invention.

FIG. 1B is a block diagram of an exemplary slow associated control channel (SACCH) block, which may be used in accordance with an embodiment of the invention. Referring to FIG. 1B, the SACCH block 126 may comprise 23 octets for a total of 184 bits. Octets 1 and 2 may comprise level 1 (L1) control information and octets 3, 4, . . . , 23 may comprise level 3 (L3) system information. The L1 control information may comprise fast power control (FPC) bit information 128, ordered mobile station power level 130, and ordered timing advance 132. The spare bits within the SACCH block 126 may be encoded with the binary value 0, for example.

The FPC bit 128 may have a different interpretation depending on the channel mode of the channel to which the SACCH 126 is associated. For example, if the channel mode for a wireless connection is such that FPC may be used, the FPC bit 128 may indicate whether Fast Measurement Reporting and Power Control mechanism may be used. The FPC bit 128 may be coded as 0 when fast power control is not used, and 1 when fast power control is in use.

The ordered mobile station (MS) power level 130 may be used by a base station, for example, to indicate a desired transmission power level to an associated mobile station. The ordered timing advance information 132 may be communicated from a base station (BS) to an associated MS and may be used by the MS to advance its timings of transmissions to the BS so as to compensate for propagation delay.

During wireless communication of data between a BS and a MS, L3 system information in octets 3, . . . , 23 may stay unchanged. In instances when the MS is in handover or when receiving short messages, for example, L3 system information in the SACCH block 126 may change. In this regard, a continuous transmission of SACCH blocks in both uplink and downlink paths may be essential to proper exchange of data for an established wireless connection or for a wireless connection in handover. For example, an uplink path may be used by a MS to communicate measurement result messages to the BS via the SACCH 126. Similarly, a downlink path may be used by the BS to communicate system information and measurement messages to the MS via the SACCH 126.

Figure 2A:
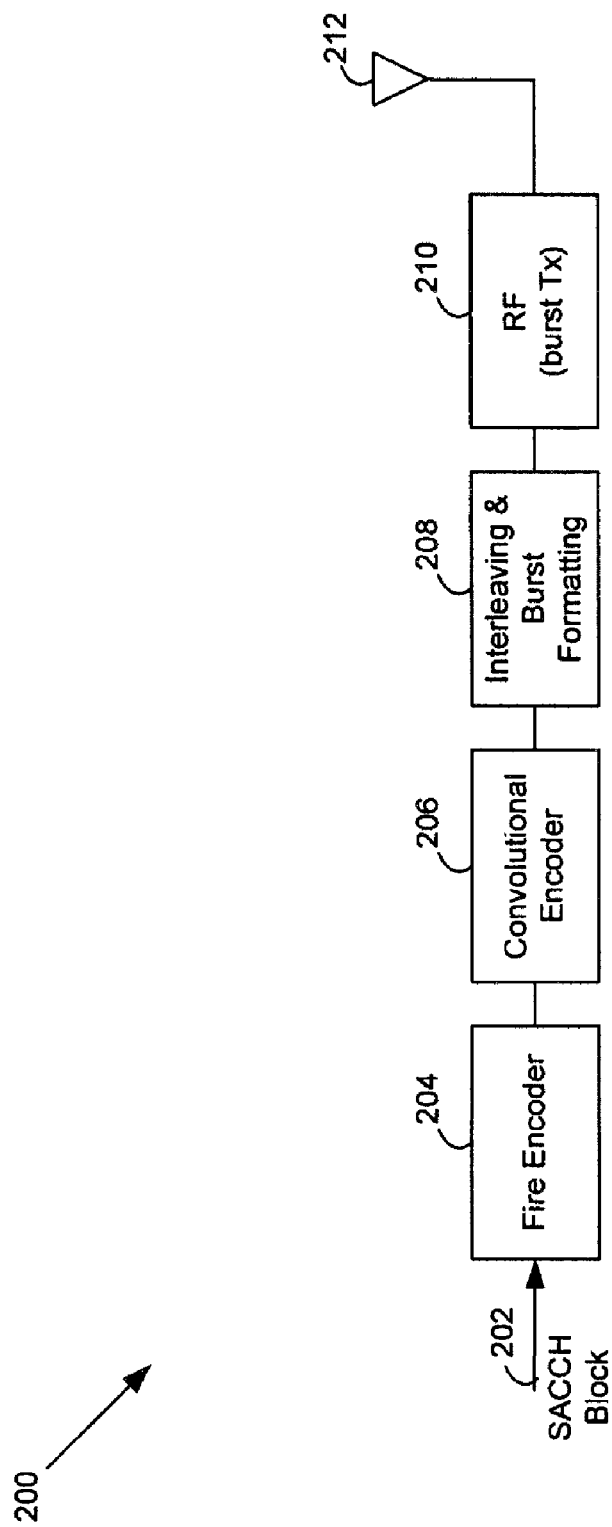
FIG. 2A is a block diagram of an exemplary base station (BS) for encoding and transmission of information, in accordance with an embodiment of the invention.

FIG. 2A is a block diagram of an exemplary base station (BS) for encoding and transmission of information, in accordance with an embodiment of the invention. Referring to FIG. 2A, the base station 200 may comprise a fire encoder 204, a convolutional encoder 206, an interleaving and burst formatting block (IBFB) 208, a radio frequency block (RFB) 210, and an antenna 212.

The fire encoder 204 may comprise suitable circuitry, logic, and/or code and may enable block coding of received bit sequence, such as the SACCH block 202. The fire encoder 204 may append the received 184 bits of the received SACCH block 202 with 40 parity bits. The 40 parity bits may be calculated by the encoder 204 based on the SACCH block 202 and may be used by a receiver during error correction. Furthermore, the 40 parity bits may be used for correction of a burst of errors, such as 12 errors within a single portion of transmitted data.

The convolutional encoder 206 may comprise suitable circuitry, logic, and/or code and may enable one-half rate encoding of fire encoded data. The convolutional encoder 206 may utilize multiplication by a finite-field polynomial and may generate 2 encoded bits for each input bit. In this regard, the number of bits at the output of the convolutional encoder 206 is double the number of input bits at the input of the encoder 206.

The IBFB 208 may comprise suitable circuitry, logic, and/or code and may enable interleaving of encoded bits so that sequential coded bits are not next to each other during transmission. In this regard, interleaving may be used for randomizing errors in a transmit channel. The IFBF 208 may also enable burst formatting or adding framing bits to the interleaved encoded bitstream, resulting in burst formation. Burst formatting may comprise, for example, adding a training sequence to the interleaved and encoded bitstream.

The RFB 210 may comprise suitable circuitry, logic, and/or code and may enable further processing, such as modulation, signal amplification and filtering of the interleaved and burst-formatted signal received form the IBFB 208. The resulting RF signal may be transmitted via the antenna 212.

Figure 2B:
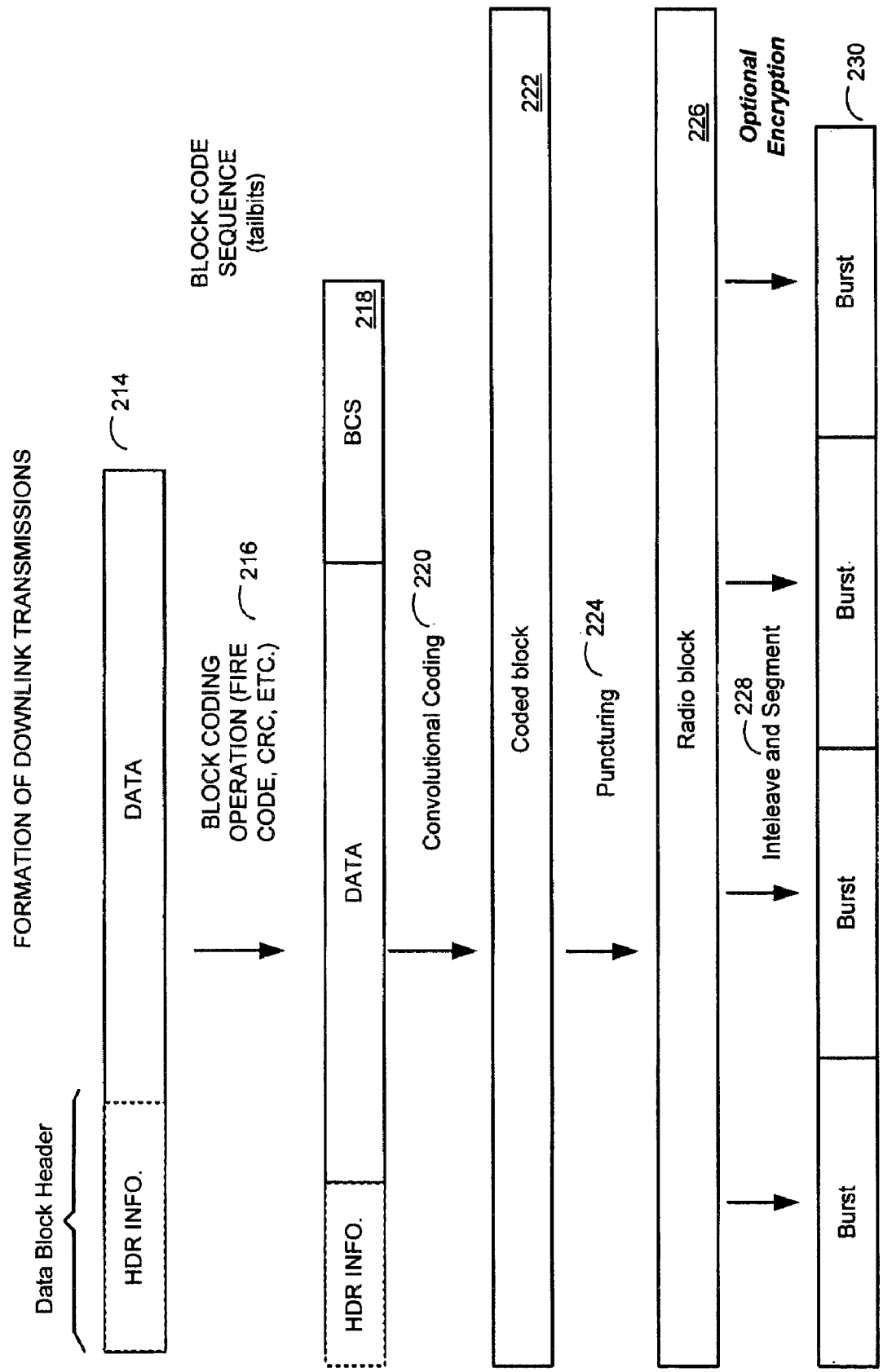
FIG. 2B is a block diagram illustrating formation of an exemplary downlink transmission, in accordance with an embodiment of the invention.

FIG. 2B is a block diagram illustrating formation of an exemplary downlink transmission, in accordance with an embodiment of the invention. Referring to FIGS. 2A and 2B, data 214, such as the 168-bits of L3 information within the SACCH block 202, may be initially uncoded and maybe accompanied by a data block header, such as the 16-bits of L1 information within the SACCH block 202. Block coding operations 216 may then be performed on the data block 214 resulting in a block coding sequence (BCS) 218, which is appended to the data 214. The block coding operation 216 may be used for error detection/correction for the data block 214 and may comprise a Fire Code operation.

Fire codes allow for either error correction or error detection. Fire Codes are a shortened binary cyclic code that appends redundancy bits to bits of the data Header and Data. After block coding has supplemented the data 214 with redundancy bits for error detection, convolutional coding 220 may be performed by the convolutional encoder 206 for calculation of additional redundancy for error correction to correct the transmissions caused by the radio channels. The convolutional encoding operation 220 may result in a coded data block 222. Some redundant bits generated by the convolutional encoder 206 may be punctured prior to transmission via the puncturing operation 224 to generate a radio block 226. In this regard, puncturing may increase the rate of the convolutional code and may reduce the redundancy per data block transmitted. In addition, puncturing may lower the bandwidth requirements such that the convolutional encoded signal may fit into the available channel bit stream. The convolutional encoded punctured bits of the radio block 226 may be communicated to the IBFB 208, which may shuffle various bit streams and segments of the interleaved bit streams into the 4 bursts 230. The bursts 430 may be further modulated and converted to RF by the RFB 210. The RF bursts may be transmitted via the antenna 212.

Figure 3A:
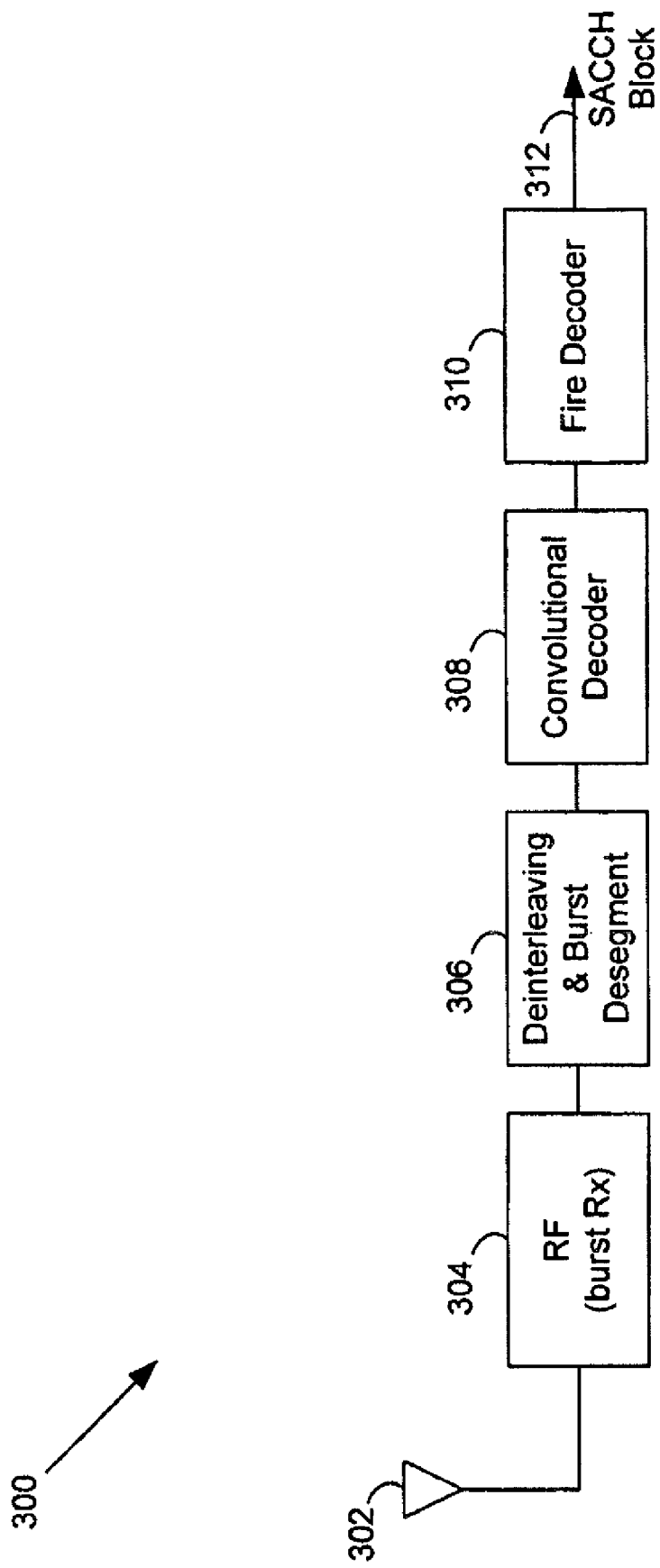
FIG. 3A is a block diagram of an exemplary mobile station (MS) for recovery of received data, in accordance with an embodiment of the invention.

FIG. 3A is a block diagram of an exemplary mobile station (MS) for recovery of received data, in accordance with an embodiment of the invention. Referring to FIG. 3A, the mobile station 300 may comprise a radio frequency block (RFB) 304, an antenna 302, a deinterleaver and burst desegmentation block (DBDB) 306, a convolutional decoder 308, and a fire decoder 310.

The RFB 304 may comprise suitable circuitry, logic, and/or code and may enable processing of RF bursts received via the antenna 302. For example, the RFB 304 may enable downconversion, signal amplification and filtering of the received RF bursts to generate interleaved and burst-formatted encoded bitstream data.

The DBDB 306 may comprise suitable circuitry, logic, and/or code and may enable deinterleaving of interleaved bitstream data. The DBDB 306 may also enable burst desegmentation by removing framing bits from the received bitstream data.

The convolutional decoder 308 may comprise suitable circuitry, logic, and/or code and may enable one-half rate decoding of the deinterleaved and desegmented data received from the DBDB 306. The convolutional decoder 308 may utilize Viterbi decoding to provide error correction, and may generate, for example, 1 decoded bit for each 2 input encoded bits. The Viterbi decoded data may be communicated to the fire decoder 310. The fire decoder 310 may comprise suitable circuitry, logic, and/or code and may enable decoding of a bit sequence received from the Viterbi decoder 308. The fire decoder 310 may extract 40 parity bits from the received bit sequence, generating 184 bits of the received SACCH block 312. The extracted 40 parity bits may be used by the fire decoder 310 to decide if the Fire decoded was successful within the SACCH block 312.

Figure 3B:
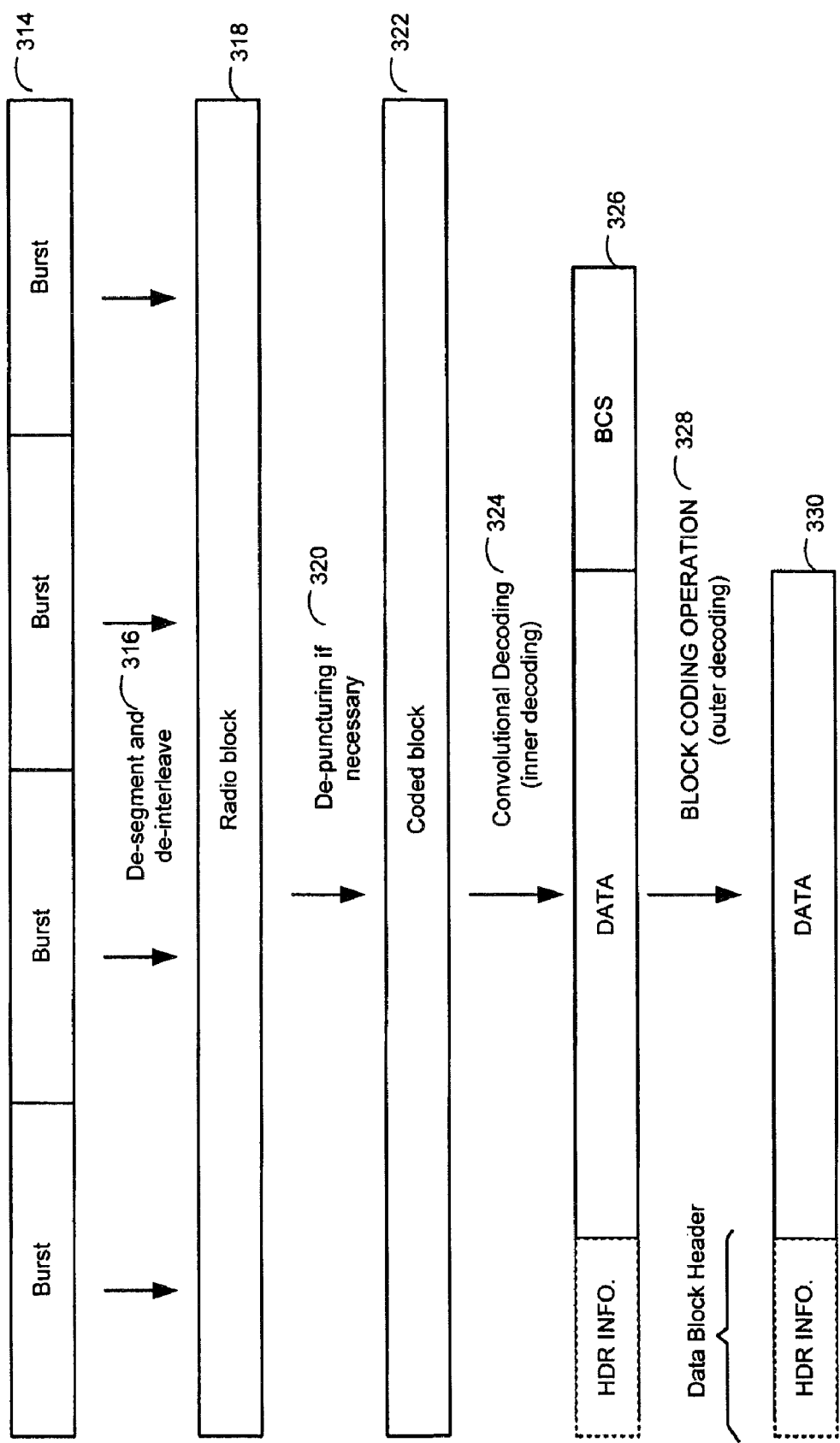
FIG. 3B is a block diagram illustrating recovery of data within a mobile station (MS), in accordance with an embodiment of the invention.

FIG. 3B is a block diagram illustrating recovery of data within a mobile station (MS), in accordance with an embodiment of the invention. Referring to FIGS. 3A and 3B, interleaved and segmented bursts 314 may be received by the DBDB 306. The DBDB 306 may apply a desegmentation and deinterleaving operation 316 to generate an encoded radio block 318. The encoded radio block 318 may be communicated to the Viterbi decoder 308 and a depuncturing operation 320 may be performed by the Viterbi decoder 308 to generate a coded block 322. A convolutional decoding operation 324 may be applied to the coded block 322 to generate the header information, data and BCS 326. The generated header, data and BCS information 326 may be communicated to the fire decoder 310. The fire decoder 310 may apply a block decoding operation or an outer decoding operation 328 to extract the BCS and generate header information and data 330.

Figure 4A:
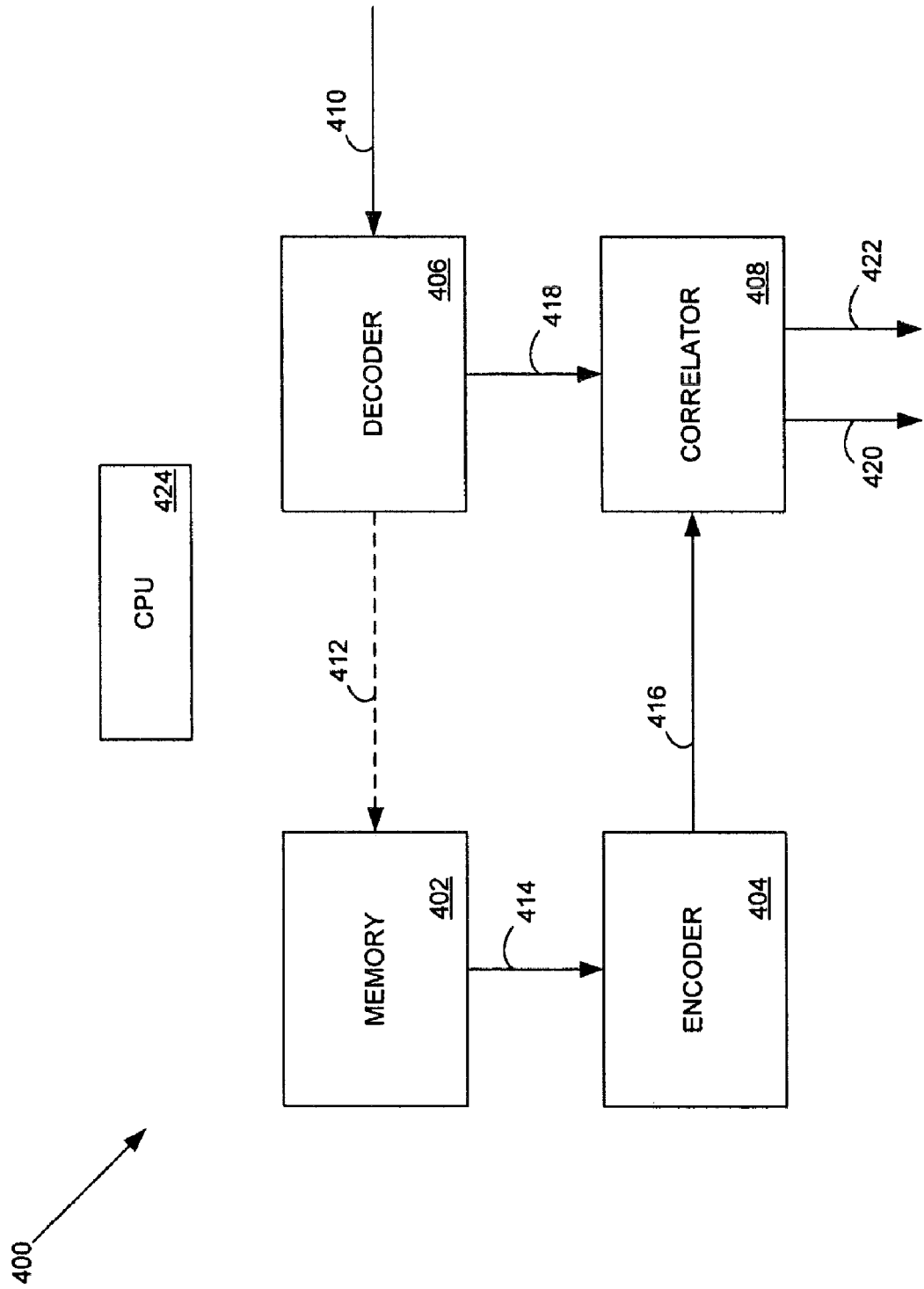
FIG. 4A is block diagram illustrating a system for recovery of a slow associated control channel (SACCH) block using standard decoding and partial combining, in accordance with an embodiment of the invention.

FIG. 4A is block diagram illustrating a system for recovery of a slow associated control channel (SACCH) block using standard decoding and partial combining, in accordance with an embodiment of the invention. Referring to FIG. 4A, the system 400 for recovery of a slow associated control channel (SACCH) block may comprise a CPU 424, memory 402, an encoder 404, a decoder 406, and a correlator block 408.

The decoder 406 may comprise suitable circuitry, logic, and/or code and may enable decoding of a received encoded SACCH block 410. In this regard, the decoder 406 may comprise a convolutional decoder and/or a fire code decoder. The convolutional decoder within the decoder 406 may comprise a Viterbi decoder. The memory 402 may store a plurality of previously received and decoded SACCH blocks.

The encoder 404 may comprise suitable circuitry, logic, and/or code and may enable re-encoding of previously received and decoder SACCH blocks stored in the memory 402. The encoder 404 may comprise a fire code encoder and/or a convolutional encoder. The correlator block 408 may comprise suitable circuitry, logic, and/or code and may enable correlation of the received SACCH blocks 410 with a plurality of previously received SACCH blocks stored in the memory 402. The CPU 424 may comprise suitable circuitry, logic, and/or code and may control the recovery of the received encoded SACCH block 410.

In operation, the decoder 406 may receive an encoded SACCH block 410. The decoder 406 may then attempt decoding of the received encoded SACCH block 410 utilizing Viterbi decoding and/or fire code decoding, for example. If the Viterbi decoding and the fire code decoding is successful, the decoded SACCH block 412 may be stored in the memory 402. The memory 402 may enable storing of previously received SACCH blocks that have been successfully decoded by the decoder 406. Furthermore, the memory 402 may also store a time that each of the previous SACCH blocks was received by the decoder 406.

In one embodiment of the invention, the CPU 424 may check whether the decoded SACCH block 412 is identical to any of the previously decoded SACCH blocks stored in the memory 402. If decoded SACCH block 412 matches any of the previously decoded SACCH blocks stored in the memory 402, the CPU 424 may increment a likelihood value associated with the matched and previously decoded SACCH block stored in the memory 402. Furthermore, the CPU 424 may prevent storing of the decoded SACCH block 412 in the memory 402.

If the Viterbi and fire code decoding within the decoder 406 is not successful, the received SACCH block 410 may be communicated to the correlator block 408 via the connection 418. In instances when decoding by the decoder 406 is not successful, one or more previously decoded SACCH blocks stored in the memory 402 may be communicated to the encoder 404 via the connection 414. The encoder 404 may re-encode one or more previously decoded SACCH blocks received from the memory 402. For example, the encoder 404 may utilize a fire code encoder and/or a convolutional encoder for the re-encoding. The re-encoded and previously received SACCH blocks may be communicated to the correlator block 408 via the connection 416.

The correlator block 408 may correlate the received encoded SACCH block 410 with one or more of the re-encoded SACCH blocks received from the encoder 404. The correlator block 408 may select a maximum correlation. In addition, the correlator block 408 may determine whether the maximum correlation is higher than a threshold value. If the maximum correlation is higher than a threshold value, the correlator block 408 may select a corresponding previously received SACCH block associated with the maximum correlation to represent the received encoded SACCH block 410. The correlator block 408 may then generate a "success flag" 420, which may be communicated with the corresponding previously received SACCH block. If the maximum correlation is not higher than the threshold value, the correlator block 408 may communicate a "SACCH unknown" flag 422.

Figure 4B:
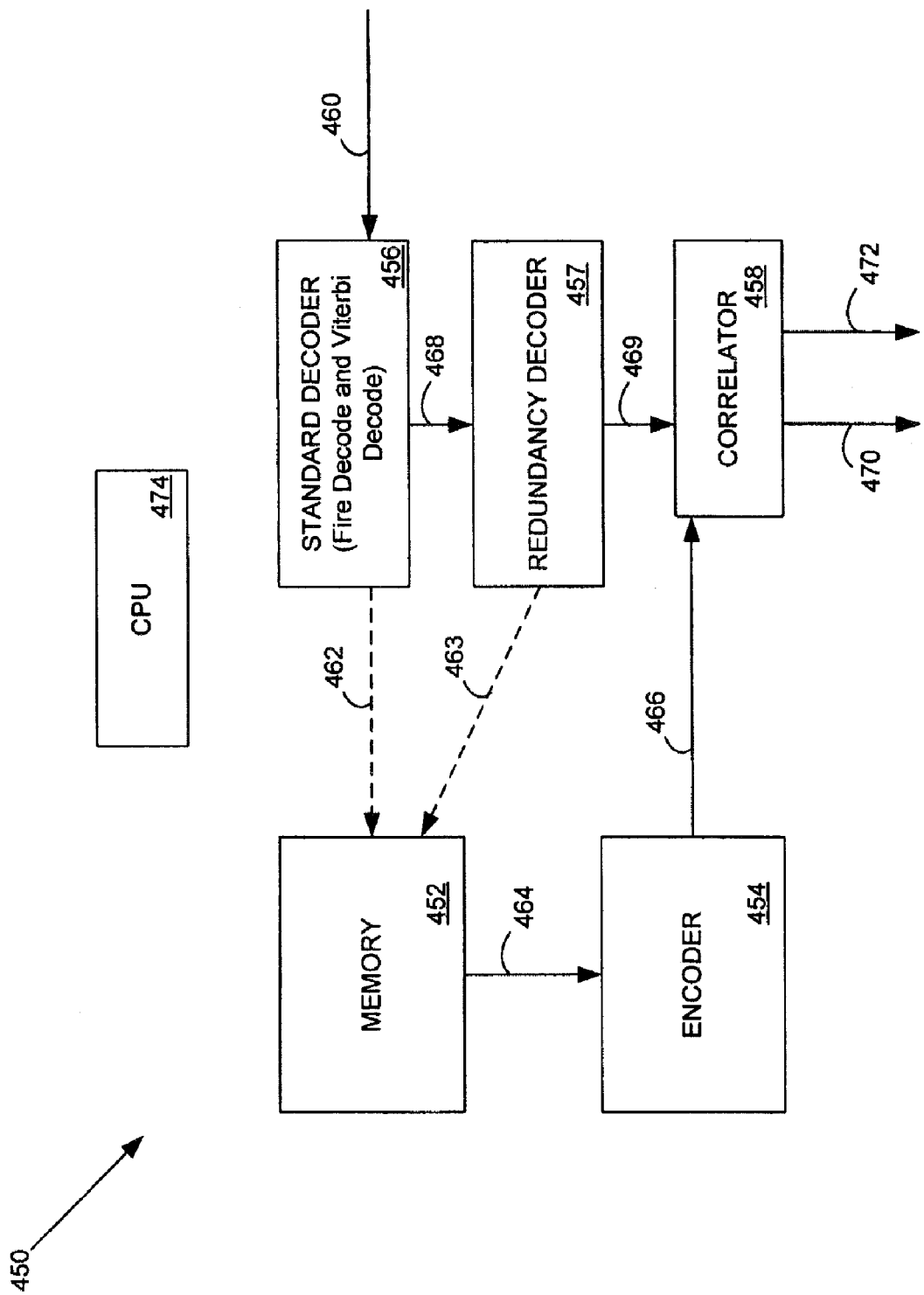
FIG. 4B is block diagram illustrating a system for recovery of a slow associated control channel (SACCH) block using decoding with redundancy and partial combining, in accordance with an embodiment of the invention.

FIG. 4B is block diagram illustrating a system for recovery of a slow associated control channel (SACCH) block using decoding with redundancy and partial combining, in accordance with an embodiment of the invention. Referring to FIG. 4B, the system 450 for recovery of a slow associated control channel (SACCH) block may comprise a CPU 474, memory 452, an encoder 454, a standard decoder 456, a redundancy decoder 457, and a correlator block 458.

The CPU 474, the memory 452, the encoder 454, the standard decoder 456, and the correlator block 458 may comprise suitable circuitry, logic, and/or code and may provide the same functionalities as the CPU 424, the memory 402, the encoder 404, the decoder 406, and the correlator block 408 from FIG. 4A, respectively.

The redundancy decoder 457 may comprise suitable circuitry, logic, and/or code and may enable decoding of the received SACCH block 460 using redundancy. Decoding with redundancy is further explained in U.S. application Ser. No. 11/325,721 and U.S. application Ser. No. 11/325,997, both of which were filed on Jan. 5, 2006. Each of these applications is hereby incorporated herein by reference in its entirety.

In operation, the standard decoder 456 may receive an encoded SACCH block 460. The decoder 456 may then attempt decoding of the received encoded SACCH block 460 utilizing Viterbi decoding and/or fire code decoding, for example. If the Viterbi decoding and the fire code decoding is successful, the decoded SACCH block 462 may be stored in the memory 452. The memory 452 may enable storing of previously received SACCH blocks that have been successfully decoded by the standard decoder 456. Furthermore, the memory 452 may also store a time that each of the previous SACCH blocks was received by the standard decoder 456.

If the Viterbi and fire code decoding within the standard decoder 456 is not successful, the received SACCH block 460 may be communicated to the redundancy decoder 457 via the connection 468. The redundancy decoder 457 may then attempt decoding of the received encoded SACCH block 460 utilizing redundancy, for example. If the redundancy decoding is successful, the decoded SACCH block 463 may be stored in the memory 452.

In one embodiment of the invention, the CPU 474 may check whether the decoded SACCH block 462 or 436 is identical to any of the previously decoded SACCH blocks stored in the memory 402. If decoded SACCH block 462 or 463 matches any of the previously decoded SACCH blocks stored in the memory 452, the CPU 474 may increment a likelihood value associated with the matched and previously decoded SACCH block stored in the memory 452. Furthermore, the CPU 474 may prevent storing of the decoded SACCH block 462 or 463 in the memory 452.

If the decoding within the redundancy decoder 457 is not successful, the received SACCH block 460 may be communicated to the correlator block 458 via the connection 469. In instances when decoding by the redundancy decoder 457 is not successful, one or more previously decoded SACCH blocks stored in the memory 452 may be communicated to the encoder 454 via the connection 464. The encoder 454 may re-encode the one or more previously decoded SACCH blocks received from the memory 452. For example, the encoder 454 may utilize a fire code encoder and/or a convolutional encoder for the re-encoding. The re-encoded and previously received SACCH blocks may be communicated to the correlator block 458 via the connection 466.

The correlator block 458 may correlate the received encoded SACCH block 460 with one or more of the re-encoded SACCH blocks received from the encoder 454. The correlator block 458 may select a maximum correlation. In addition, the correlator block 458 may determine whether the maximum correlation is higher than a threshold value. If the maximum correlation is higher than a threshold value, the correlator block 458 may select a corresponding previously received SACCH block associated with the maximum correlation to represent the received encoded SACCH block 460. The correlator block 458 may then generate a "success flag" 470, which may be communicated with the corresponding previously received SACCH block. If the maximum correlation is not higher than the threshold value, the correlator block 458 may communicate a "SACCH unknown" flag 472.

Figure 5:
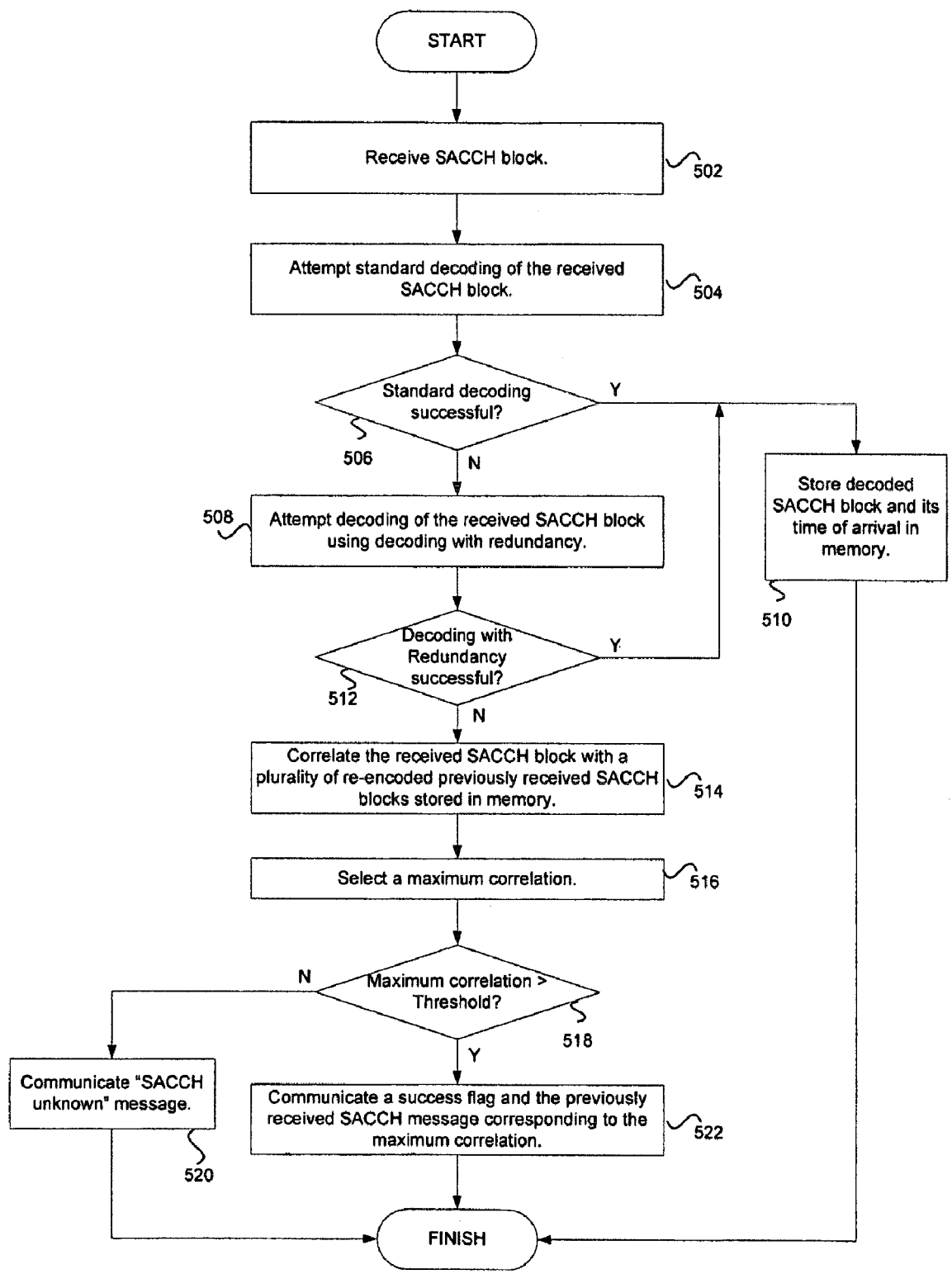
FIG. 5 is a flow diagram illustrating exemplary steps for recovering a received SACCH block, in accordance with an embodiment of the invention.

FIG. 5 is a flow diagram illustrating exemplary steps for recovering a received SACCH block, in accordance with an embodiment of the invention. Referring to FIGS. 4B and 5, at 502, a SACCH block 460 may be received by the standard decoder 456. At 504, the standard decoder 456 may attempt to decode the received SACCH block 460. At 506, it may be determined whether the decoding by the standard decoder 456 was successful. If the decoding by the standard decoder 456 was successful, at 510, the decoded SACCH block may be stored in the memory 452. If the decoding by the standard decoder 456 was not successful, at 508, the redundancy decoder 457 may attempt decoding of the received SACCH block 460.

At 512, it may be determined whether the decoding by the redundancy decoder 457 was successful. If the decoding by the redundancy decoder 457 was successful, at 510, the decoded SACCH block may be stored in the memory 452 via connection 463. If the decoding by the redundancy decoder 457 was not successful, at 514, the correlator block 458 may correlate the received SACCH block 460 with a plurality of re-encoded previously received SACCH blocks stored in the memory 452. The re-encoding may be performed by the encoder 454. At 516, the correlator block 516 may select a maximum correlation.

At 518, it may be determined whether the maximum correlation is greater than a threshold value. If the maximum correlation is greater than the threshold value, at 522, the correlator block 458 may communicate a success flag 470 and the previously received SACCH message corresponding to the maximum correlation. The previously received SACCH message corresponding to the maximum correlation may represent the received encoded SACCH message 460. If the maximum correlation is not greater than the threshold value, at 520, the correlator block 458 may communicate a "SACCH unknown" message 472.

Referring again to FIG. 4B, in one embodiment of the invention, the CPU 474 may enable storing of bit sequences for a plurality of previously received control channels. For example, bit sequences for the plurality of previously received control channels may be stored in memory 452. The CPU 474 may enable correlation of a bit sequence for a currently received control channel with at least one of the bit sequences for the plurality of previously received control channels stored within the memory 452. The correlation may be performed by the correlator block 458. The CPU 474 may enable selection of one of the bit sequences for the plurality of previously received control channels to represent the bit sequence for the currently received control channel, based on the correlation performed by the correlator block 458. The selected one of the stored bit sequences for the plurality of previously received control channels may comprise a maximum correlation, and the maximum correlation may be higher than a threshold value. The bit sequence for the currently received control channel may comprise slow associated control channel (SACCH) information 460.

The standard decoder 456 may decode the bit sequence for the currently received control channel utilizing a Viterbi decoder and/or a fire code decoder. If the decoding of the bit sequence for the currently received control channel fails, the CPU 474 may enable selection of one of the bit sequences for the plurality of previously received control channels to represent the bit sequence 460 for the currently received control channel based on the correlation. The CPU 474 may enable storing of the decoded bit sequence 462 for the currently received control channel in the memory 452. In addition, the CPU 474 may enable storing of a time in the memory 452 when the bit sequence for the currently received control channel is received. If the decoded bit sequence 462 for the currently received control channel is equal to a particular one of the bit sequences for the plurality of previously received control channels, the CPU 474 may enable incrementing of a likelihood value associated with the particular one of the bit sequences for the plurality of previously received control channels. The CPU 474 may enable encoding of each of the bit sequences for the plurality of previously received control channels stored in the memory 452 prior to the correlation.

Another embodiment of the invention may provide a machine-readable storage having stored thereon, a computer program having at least one code section for processing of information, the at least one code section being executable by a machine for causing the machine to perform steps as disclosed herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other-portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

The invention claimed is:

1. A method for signal processing, the method comprising:
    storing a bit sequence for a previously received control channel;
    re-encoding the bit sequence;
    correlating a currently received control channel with the re-encoded-bit sequence, to generate a correlation value; and
    selecting the bit sequence to represent the currently received control channel, based on the correlation value.

2. The method according to claim 1, wherein the currently received control channel comprises slow associated control channel (SACCH) information.

3. The method according to claim 1, comprising decoding the currently received control channel utilizing one or both of a Viterbi decoder and a fire code decoder.

4. The method according to claim 3, comprising, if the decoding of the currently received control channel fails and the correlation value exceeds a threshold, selecting the bit sequence to represent the currently received control channel.

5. The method according to claim 3, comprising storing a decoded bit sequence for the currently received control channel in a memory.

6. The method according to claim 5, comprising storing a time in the memory when the currently received control channel is received.

7. A system for signal processing, the system comprising:
    at least one processor operable to:
        store bit sequences for a plurality of previously received control channels;
        correlate a currently received control channel with at least one re-encoded bit sequence corresponding to the plurality of previously received control channels, to generate at least one correlation value; and
        select one of the bit sequences for the plurality of previously received control channels to represent the currently received control channel, based on the correlation value.

8. The system according to claim 7, wherein the currently received control channel comprises slow associated control channel (SACCH) information.

9. The system according to claim 7, wherein the at least one processor is operable to decode a bit sequence for the currently received control channel utilizing one or both of a Viterbi decoder and a fire code decoder.

10. The system according to claim 9, wherein the at least one processor is operable to select one of the bit sequences for the plurality of previously received control channels to represent the bit sequence for the currently received control channel based on the correlation value, if the decoding of the bit sequence for the currently received control channel fails.

11. The system according to claim 9, wherein the at least one processor is operable to store the decoded bit sequence for the currently received control channel in a memory.

12. The system according to claim 11, wherein the at least one processor is operable to store a time in the memory when the currently received control channel is received.

13. A system for signal processing, the system comprising:
    a memory operable to store a decoded control channel;
    a control channel encoder operable to re-encoded the decoded control channel;
    a correlator operable to correlate a received control channel with the re-encoded control channel to generate at least one correlation value; and
    a processor operable to associate the decoded control channel with the received control channel, based on the correlation value.

14. The system according to claim 13, wherein the system comprises a decoder operable to decode the received control channel.

15. The system according to claim 14, wherein the system comprises a processor operable to associate the decoded control channel with the received control channels, if the received control channel is not decoded correctly.

16. The system according to claim 13, wherein the system comprises a processor operable to store a bit sequence, associated with the received control channel, in the memory.

17. The system according to claim 16, wherein the processor is operable to store a time, associated with the arrival of the received control channel, in the memory.

18. The system according to claim 13, wherein the decoded control channel comprises slow associated control channel (SACCH) information.

19. The system according to claim 13, wherein the processor is operable to decode a bit sequence for the received control channel utilizing one or both of a Viterbi decoder and a fire code decoder.

20. The system according to claim 19, wherein the at least one processor is operable to select a bit sequence associated with a previous control channel to represent the bit sequence for the received control channel based on the correlation value, if the decoding of the bit sequence for the received control channel fails.

* * * * *